United States Patent Office 3,205,670
Patented Sept. 14, 1965

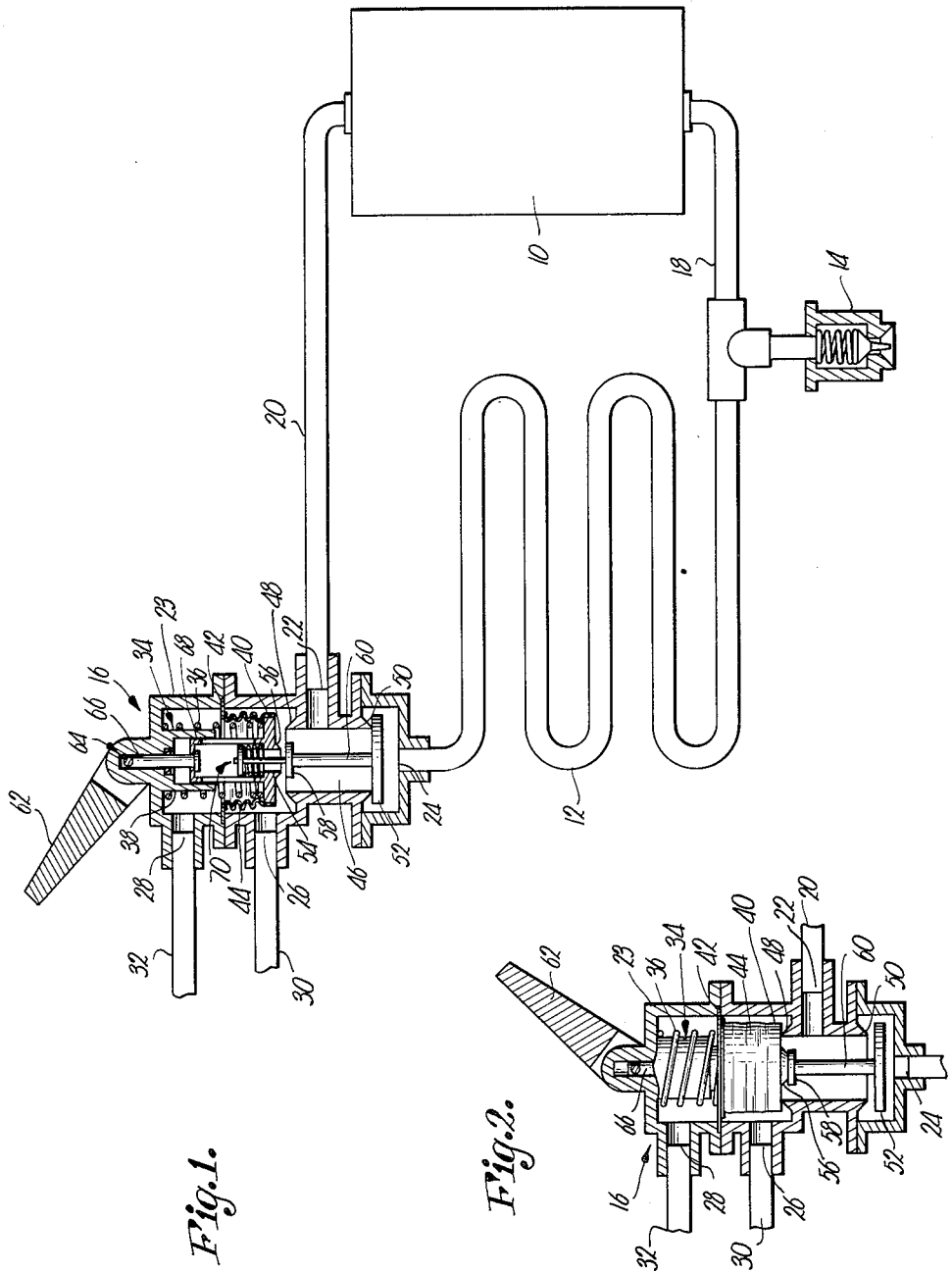

3,205,670
OXYGEN SUPPLY SYSTEM
Raymond J. Carolan, Prairie Village, Kans., assignor to Puritan Compressed Gas Corporation, Kansas City, Mo.
Filed Sept. 24, 1962, Ser. No. 225,466
6 Claims. (Cl. 62—52)

This invention relates to liquid oxygen converters and to valve structure for controlling the operation of such converters.

The purpose of a liquid oxygen converter is to store oxygen in the liquid state and to control the evaporation and pressure of the oxygen so that gaseous oxygen may be delivered at pressures and temperatures suitable for breathing. Utilization of such converters is primarily for the supply of oxygen for the crews of aircraft flying at high altitudes. Liquid oxygen converters replace the prior supply system which utilized oxygen stored in pressure tanks.

Although the prior system operated satisfactorily, the weight and space requirements were large as compared with the newer, liquid oxygen systems. Present liquid oxygen supply systems, however, require a number of valves and evaporation coils for satisfactory operation. Therefore, although lighter and more compact, the liquid oxygen converters heretofore utilized are considerably more complex than the pressure tank systems.

It is, therefore, an object of this invention to provide a liquid oxygen converter of minimum size and weight.

It is another object of this invention to provide such a converter that is especially adaptable for supplying oxygen to air-borne crews.

It is still another object of this invention to provide a simplified liquid oxygen converter capable of performing the various functions of apparatus heretofore known in the art but achieving this result by utilizing only a single evaporating coil and one integral control mechanism.

It is still another object of this invention to provide control valve structure operable in combination with the other elements of a liquid oxygen converter system or operable in any application where it is desired to maintain the pressure of a fluid system within a predetermined range while simultaneously controlling the output of the system under conditions of varying demand.

Other objects will become apparent as the detailed description proceeds.

In the drawing:

FIGURE 1 is a diagrammatic representation of the oxygen supply system of the present invention showing the converter controller and the filler valve partially in section; and FIG. 2 is a view of the converter controller with parts broken away showing the internal mechanism thereof in elevation.

Referring to the figures, it may be seen that the converter system comprises a container 10, an evaporating coil 12, a filler valve 14, and a converter controller generally designated 16. A conduit 18 connects the lower end of the evaporating coil 12 with the bottom of the container 10. A conduit 20 connects the top of container 10 with an inlet port 22 in the housing 23 of the controller 16. The upper end of evaporating coil 12 is connected to an inlet port 24 in the housing 23 of controller 16. Housing 23 also contains an outlet port 26 and a vent port 28. A conduit 30 leads from outlet port 26 to the oxygen distribution system of the aircraft. A conduit 32 leads from vent port 28 to atmosphere and serves as a relief in the event of over-pressurization in the system.

Before the details of the converter controller 16 and the remainder of the system are discussed, the basic function of a liquid oxygen converter system should be understood. Oxygen in the liquid state is an extremely cold substance having a boiling point of −297° F. Therefore, at temperatures above the boiling point, the liquid oxygen will constantly be boiling and undergoing conversion into the gaseous state. It is the function of a liquid oxygen converter to allow the liquid oxygen to convert to the gaseous state and then supply the gaseous oxygen to the user.

The evaporating coil 12 is utilized to increase the speed of conversion from the liquid state to the gaseous state by a heat exchange between the liquid in the coil and the ambient atmosphere. This is easily effected due to the extremely low boiling point of liquid oxygen. The pressure in the system must then be allowed to build up to a certain point, at which time gaseous oxygen is made available to the user by the action of the controller 16.

To achieve this end the controller 16 is provided with a spring-loaded bellows assembly generally designated 34 that is responsive to the pressure in the evaporating coil 12 and the container 10. The bellows assembly 34 is provided with a spring 36 anchored about a cylindrical neck portion 38 extending downwardly within the housing 23. The spring 36 is retained at its lower extremity to a valve member 40. A ring 42 surrounds the spring 36 and has a flexible, air-tight sheath 44 attached thereto. The sheath 44 is also attached to valve member 40 to define the upper limit of a chamber 46 within the housing 23. Within the chamber 46 are valve seats 48 and 50. Valve member 40 is engageable with valve seat 48, and a valve member 52 is engageable with valve seat 50.

Valve member 40 has an aperture 54 therein with a valve seat 56 surrounding said aperture. A valve member 58 is engageable with valve seat 56 and is interconnected with valve member 52 by valve rod 60.

When it is desired to fill container 10 with liquid oxygen prior to utilization of the oxygen supply system, the handle 62 of the controller 16 is in the leftward position as shown in FIG. 1. Handle 62 actuates a toggle mechanism generally designated 64, which raises the bellows assembly 34 to the position shown. This is effected by engagement of a toggle link 66 with an inner cylinder 68 which rides within the cylindrical neck portion 38. The inner cylinder 68 is rigid with valve member 40 and thus, the entire bellows assembly 34 may be raised upwardly.

When the bellows assembly 34 is raised by the action of the toggle mechanism 64, the valve member 52 will become engaged with valve seat 50 before the bellows assembly 34 reaches its maximum upward position. The valve member 58 is provided with a spring-loaded rod and piston assembly 70 movable within the inner cylinder 68 and normally biasing valve member 58 in engagement with valve seat 56. However, when valve member 52 engages valve seat 50 during the upward travel of the bellows assembly 34, the valve member 58 is maintained against further upward movement by the valve rod 60 interconnecting valve member 58 with valve member 52. Further upward movement of the bellows assembly 34 is then against the action of the spring in the spring-loaded rod and piston assembly 70, and the valve member 58 is thereby separated from valve seat 56.

It may be seen in FIG. 1, that the inner cylinder 68 contains openings in the body thereof. Therefore, when the controller 16 is in the vent position shown in FIG. 1, the container 10 is vented to atmosphere through the conduit 20, inlet port 22, aperture 54, vent port 28, and conduit 32. In this position, the container 10 may be filled with liquid oxygen through the filler valve 14. Since the container 10 is vented to atmosphere, it will be evident when it is full as liquid oxygen will begin to escape from the end of conduit 32 (the overboard vent).

After the container 10 is filled with liquid oxygen, the handle 62 is moved to the right to the position as shown in FIG. 2. This releases the toggle mechanism 64 and allows assembly 34, through the action of spring 36, to engage valve member 40 with valve seat 48. Valve member 58 is also allowed to engage valve seat 56 under the action of the spring of the spring-loaded rod and piston assembly 70. The apparatus is then in the "build-up" position and the rapid conversion of liquid oxygen to gaseous oxygen will then commence.

It should be noted that the parts within the controller 16 are so arranged that valve 56, 58 will close; valve 50, 52 will open; and valve 40, 48 will close in that order when the handle 62 is initially moved from the vent position shown in FIG. 1, to the build-up position shown in FIG. 2.

In the build-up position, any liquid which had been converted into gas in the evaporating coil 12 during the filling of container 10, escapes through valve 50, 52 to port 22 and on to the top of container 10 through conduit 20. Simultaneously, liquid oxygen due to gravity, is allowed to flow from the container 10 through conduit 18 into the bottom of the evaporating coil 12. The liquid oxygen now present in evaporating coil 12 is converted to gas due to the heat exchange in the evaporating coil, and the pressure of the system is allowed to build up to a predetermined value. This value may be controlled by adjustment of the spring 36 of the bellows assembly 34. It will be assumed for purposes of illustration, that this pressure is 75 pounds per square inch.

As the pressure continues to build up due to the heat exchange in the evaporating coil, bellows assembly 34 is forced upwardly due to the pressure in chamber 46, pushing against valve members 40 and 58. If no demand for oxygen is made by the user through outlet port 26, the pressure will continue to rise until valve 50, 52 closes, at which point further flow of liquid into the bottom of the evaporating coil is prevented due to the pressure contained in the evaporating coil. When a demand is placed on the outlet port 26, gaseous oxygen flows from the top of container 10 through conduit 20, inlet port 22, and valve 40, 48 to the outlet port 26. A pressure drop in chamber 46 then allows the bellows assembly 34 to move downward again, opening valve 50, 52 and restricting valve 40, 48. This action allows pressure in the evaporating coil and pressure on top of the container to equalize, thereby allowing the liquid, due to gravity, to flow into the evaporating coil where it is converted to gas to supply the demand.

When a constant flow of gas is demanded from the outlet port 26, the bellows assembly 34 will position itself such that both valves 50, 52 and 40, 48 are open. Valve 40, 48 serves as a throttle valve to maintain the pressure in the system, and valve 50, 52 serves to supply the demand from the evaporating coil 12.

Since the ambient temperature will be higher than the boiling point of oxygen, there will naturally be some degree of "boil off" in the container 10. In other words, there will always be at least a slight amount of conversion of liquid oxygen to gaseous oxygen in the container. Therefore, if no demand, or a very small demand is made on the outlet port 26, the boil-off will raise the pressure in the system and cause the bellows assembly 34 to move upwardly until valve 50, 52 is closed. Any demand made on the outlet port 26 at this time will be supplied from the gas that has collected at the top of the container. The container itself will continue to supply the gas until the pressure is reduced in chamber 46 sufficient to open valve 50, 52 and again commence the flow of liquid oxygen into the evaporating coil 12.

Under conditions of constant demand the valves 40, 48 and 50, 52 will "float" such that both valves will remain partially open and substantially all of the gas will be supplied by the evaporating coil. Should the demand become so heavy that the pressure in the system falls below a predetermined value, valve 40, 48 will close and the system will no longer supply oxygen until the pressure is allowed once again to build up. At this minimum pressure condition valve 50, 52 is completely open, and valve 40, 48 is completely closed. For purposes of illustration it will be assumed that this minimum pressure is 60 p.s.i.

Should the other extreme occur and the demand on the supply system be so slight that the pressure is allowed to rise indefinitely, the action of valve 56, 58 is then utilized. To understand the action of valve 56, 58 it should first be noted that the travel of the bellows assembly 34 is substantially linear between the 60 p.s.i. condition and the 75 p.s.i. condition. However, for system pressures in excess of 75 p.s.i., the bellows assembly 34 is locked against movement by the closing of valve 50, 52 until such pressure is obtained to open valve 56, 58 against the action of the spring in the spring-loaded rod and piston assembly with which valve member 58 is connected. Assuming that the maximum allowable pressure in the system is 100 p.s.i., valve 56, 58 opens at such pressure and allows the excess gas to be ejected through vent port 28 and the overboard vent. It may be appreciated that the movement of the bellows is temporarily arrested between the pressures of 75 and 100 p.s.i. due to the additional bias provided by the spring in assembly 70 and the reduced surface area at the base of the bellows (the area of valve member 40 minus the area of valve member 58).

The foregoing concepts may be applied, of course, to the conversion of other substances from the liquid state to the gaseous state. Due to the extremely low boiling point of oxygen, no heating means is required in the foregoing system as the temperature of the medium surrounding the evaporating coil 12 will nearly always be well above the boiling point of oxygen. Furthermore, the controller 16 may be adapted to a variety of pressurized systems wherein it is necessary to control the operation of such a system between fixed upper and lower limits.

In the utilization of the present invention for the conversion of oxygen from the liquid state to the gaseous state, the evaporating coil 12 may conveniently be wound around the exterior of the container 10 so as to form a compact unit. Maintaining the container 10 and the evaporating coil 12 as an integral unit is also advantageous from the liquid flow standpoint when gravity feed is utilized to transmit the liquid from container 10 to the evaporating coil 12. Furthermore, if an equal length of evaporating coil is placed on both the top and bottom of the container, the controller 16 would allow the system to function equally as well when the container is operated in the position shown in FIG. 1, or in the inverted position.

In the utilization of liquid oxygen converters for the supplying of breathable oxygen, it should be noted that the length of the evaporating coil 12 and the conduit 30 should be sufficient to insure that the gaseous oxygen will be reduced to a breathable temperature even though such oxygen may be supplied directly from the container 10.

Having thus described the invention, what is claimed as new and desired to be secured by Letters Patent is:

1. A liquid oxygen converter comprising:
   a container for storing liquid oxygen;
   an evaporating coil for converting liquid oxygen into gaseous oxygen;
   valve structure comprising a housing having a chamber therein and provided with a pair of inlet ports, an outlet port, a vent port, first and second valve seats, and a valve assembly, the latter comprising a first valve member for said first valve seat disposed in said chamber for communicating said inlet ports by disengagement from said first valve seat only when the pressure in said chamber is below a first predetermined value, a second valve member for said second valve seat disposed in said chamber for communicating said inlet ports with said outlet port only when the pressure in said chamber is above a second, lower predetermined value, and means disposed in said chamber and responsive to the chamber pressure for actuating said first and second valve members, said means including pressure responsive valve means for communicating said chamber with said vent port only when the chamber pressure reaches a third, higher predetermined value; and conduit means connecting said evaporating coil with said container and one of said inlet ports and connecting said container with the other of said inlet ports, whereby liquid oxygen is allowed to flow from said container to said coil for conversion to gaseous oxygen when the chamber pressure is below said first predetermined value and whereby gaseous oxygen may be obtained from the outlet port when the chamber pressure is above said second predetermined value.

2. The invention of claim 1, wherein said valve means includes means maintaining said first and second valve members a fixed distance apart until said third predetermined value is reached.

3. The invention of claim 1, wherein said valve means includes a third valve seat integral with said second valve member, a third valve member, means biasing said third valve member in engagement with said third valve seat until said third predetermined value is reached, and linkage means interconnecting said first and third valve members for holding said third valve member against the action of said bias means when said first valve member engages said first valve seat.

4. A liquid oxygen converter comprising:
a container for storing liquid oxygen;
an evaporating coil for converting liquid oxygen into gaseous oxygen;
valve structure comprising a housing having a pair of inlet ports, an outlet port, a vent port, and first and second valve seats, a pressure sensitive valve-actuating mechanism disposed within said housing to define a chamber common to said inlet ports, outlet port and valve seats, a first valve member for said first valve seat disposed in said chamber for communicating said inlet ports by disengagement from said first valve seat only when the pressure in said chamber is below a first predetermined value, a second valve member for said second valve seat carried by said actuating mechanism for communicating said inlet ports with said outlet port only when the pressure in said chamber is above a second, lower predetermined value, said second valve member having an aperture therethrough and a third valve seat surrounding said aperture, a third valve member, means biasing said third valve member in engagement with said third valve seat to close said aperture until the chamber pressure reaches a third, higher predetermined value, means communicating said aperture with said vent port, and linkage means interconnecting said first and third valve members for holding said third valve member against the action of said bias means when said first valve member engages said first valve seat; and conduit means connecting said evaporating coil with said container and one of said inlet ports and connecting said container with the other of said inlet ports, whereby liquid oxygen is allowed to flow from said container to said coil for conversion to gaseous oxygen when the chamber pressure is below said first predetermined value and whereby gaseous oxygen may be obtained from the outlet port when the chamber pressure is above said second predetermined value.

5. The invention of claim 4, wherein said valve-actuating mechanism comprises a spring-loaded bellows assembly.

6. The invention of claim 5, wherein said container and evaporating coil are generally vertically disposed, the upper end of said coil being connected to said one inlet port and the lower end thereof being connected to the bottom of said container, the top of said container being connected to said other inlet port.

References Cited by the Examiner

UNITED STATES PATENTS

| 2,277,491 | 3/42 | Huber | 137—116 |
| 2,806,481 | 9/57 | Faust | 137—116.5 |
| 2,960,099 | 11/60 | Hill | 137—116.5 |
| 2,965,121 | 12/60 | Howlett | 137—116.5 |
| 3,001,375 | 9/61 | Tauscher | 62—51 |
| 3,097,497 | 7/63 | Fitt | 62—52 |

ROBERT A. O'LEARY, *Primary Examiner.*